United States Patent [19]

Tomkinson

[11] Patent Number: 4,647,060
[45] Date of Patent: Mar. 3, 1987

[54] BICYCLE DESIGN

[76] Inventor: Philip Tomkinson, 1810 Cedar Hill Dr., Birmingham, Mich. 48010

[21] Appl. No.: 670,168

[22] Filed: Nov. 13, 1984

[51] Int. Cl.⁴ .............................................. B60K 5/07
[52] U.S. Cl. ............................ 280/281 LP; 280/278; 280/281 R
[58] Field of Search ................. 280/281 LP, 278, 287, 280/260

[56] References Cited

U.S. PATENT DOCUMENTS

| | | | |
|---|---|---|---|
| 751,236 | 2/1904 | Wiley et al. | 280/278 |
| 846,033 | 3/1907 | Kidney | 280/281 LP |
| 1,798,384 | 3/1931 | Roberds | 280/260 |
| 2,993,709 | 7/1961 | Wick | 280/287 |

FOREIGN PATENT DOCUMENTS

| | | |
|---|---|---|
| 292314 | 1/1966 | Australia . |
| 2610644 | 9/1977 | Fed. Rep. of Germany . |
| 888150 | 12/1943 | France . |
| 236146 | 1/1945 | Switzerland . |

Primary Examiner—John J. Love
Assistant Examiner—Donn McGiehan
Attorney, Agent, or Firm—Robert F. Hess

[57] ABSTRACT

A low-drag bicycle comprising an elongated, two piece, generally tubular frame of elliptical cross-section extending between the front and rear wheels wherein the cyclist assumes a recumbent position over the frame facing down and powers the cycle by means of a pedal arrangement and transmission directly connected to and concentrically arranged with the rear wheel axle.

5 Claims, 7 Drawing Figures

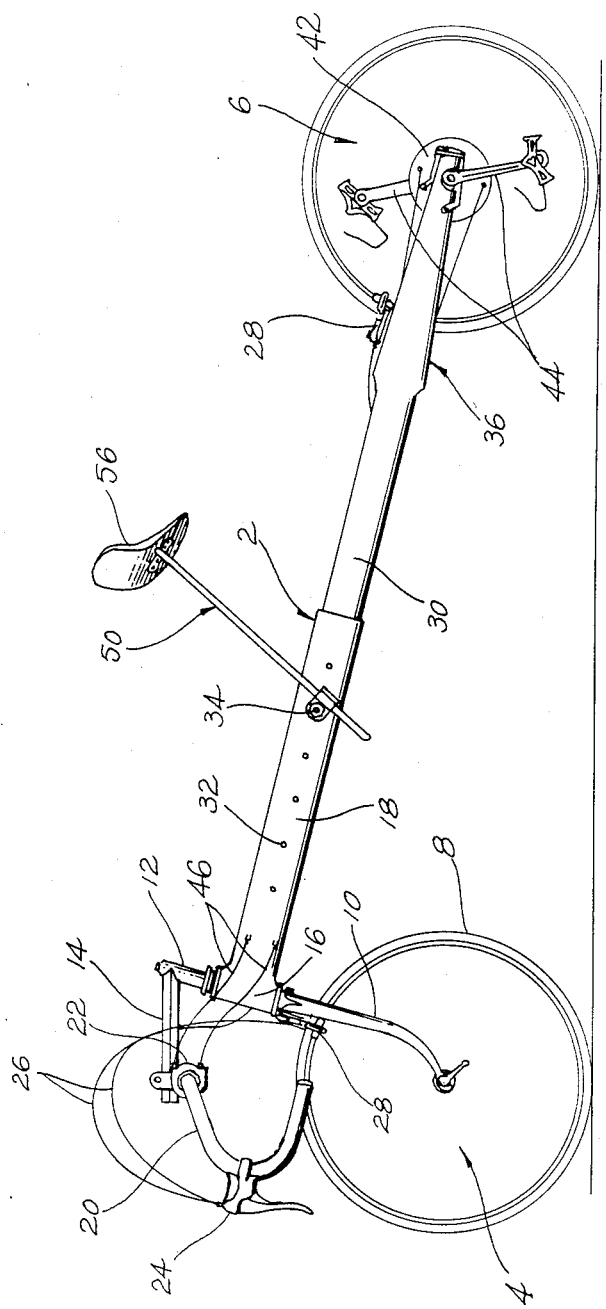
Fig. I.

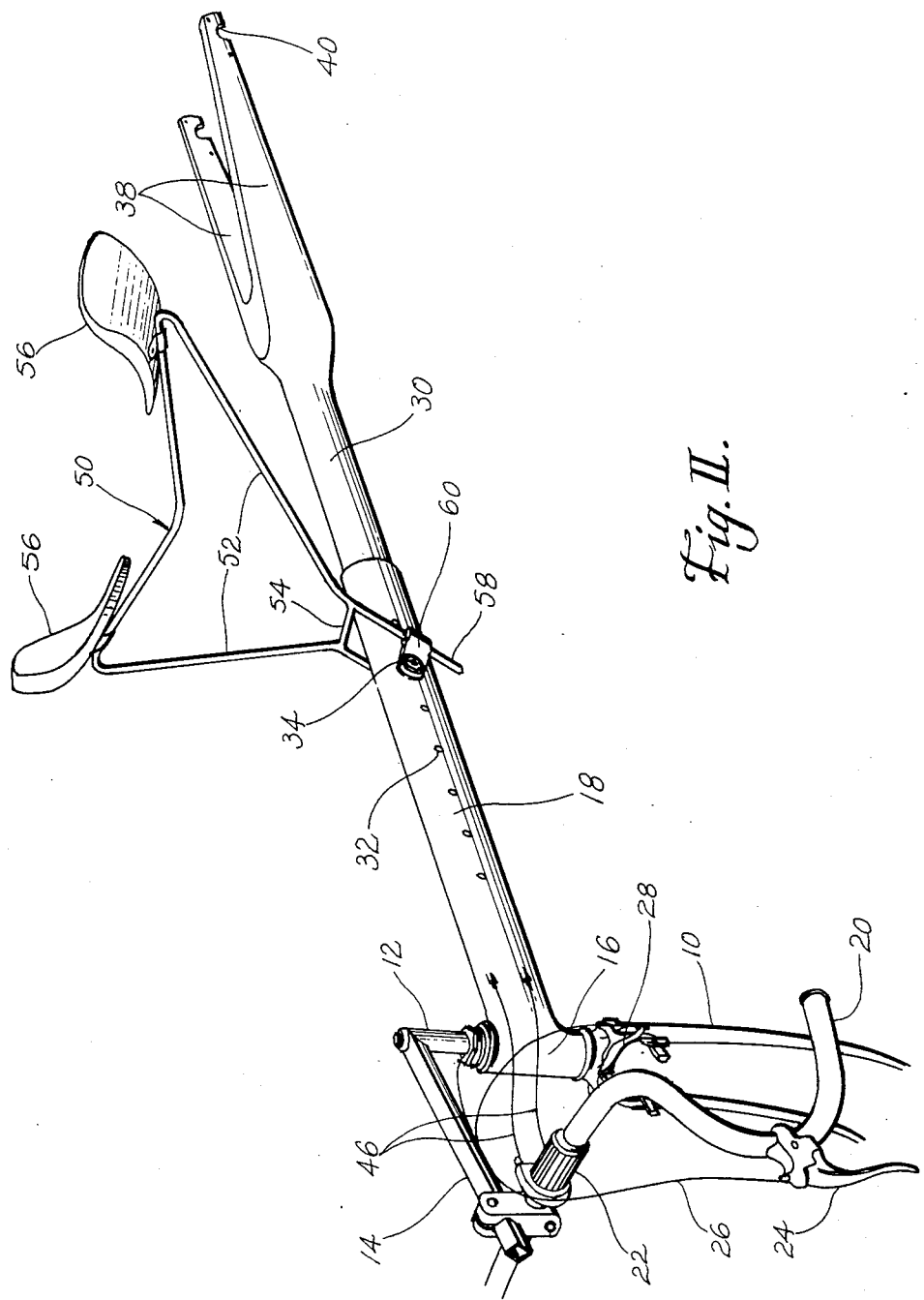
Fig. II.

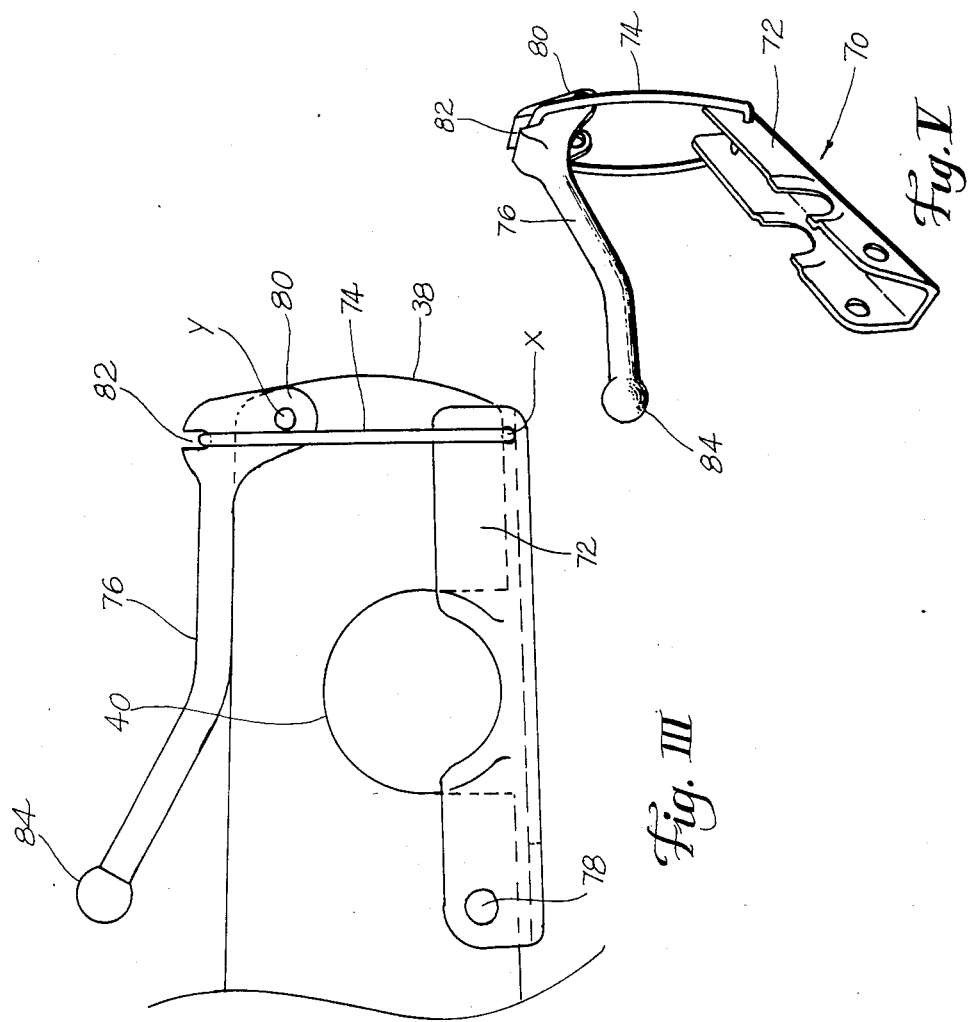

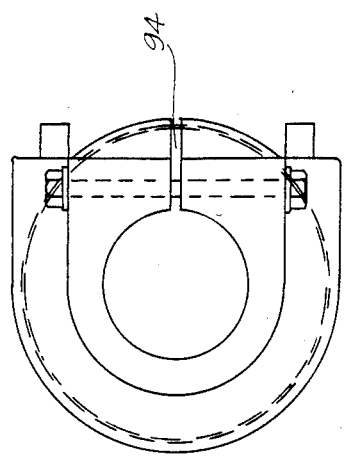
Fig. VII.
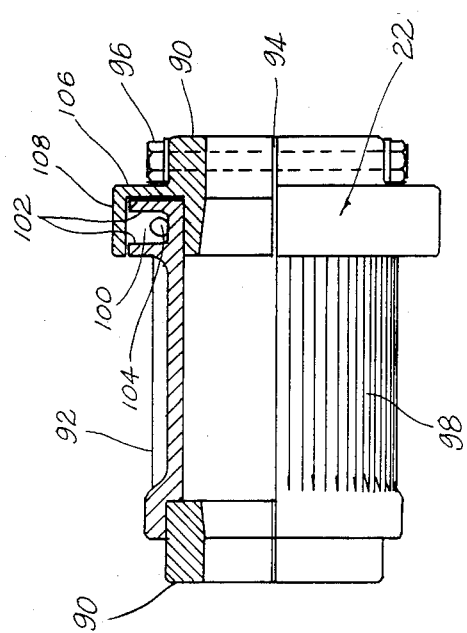
Fig. VI.

4,647,060

BICYCLE DESIGN

FIELD OF THE INVENTION

This invention is related to human powered vehicles, and more particularly to racing bicycles.

BACKGROUND OF THE INVENTION

The basic design of the bicycle has remained unchanged for several decades. Even racing bicycles, in spite of weight reductions and significant improvements in equipment, remain derivative of the old "sit-up and beg" machines used for anything from shopping to cross country cycling. These bicycles typically include the classic diamond frame with front and rear wheels, the rear wheel being driven by a pedal crank located intermediate the front and rear wheels and a chain drive connected to a rear axle mechanism, generally having a multispeed derailleur device located at the rear wheel for changing speeds. A major cause of both friction losses and distortion in the traditional frame lies in the use of such a remote chain wheel and sprocket system transmitting power from the bottom bracket of the frame to the rear wheel. Further, with such a traditional design the center of effort (the pedal crank axis) located ahead of the rear wheel, results in both the imposition of torsional stresses on the frame and in the fact that on the downward stroke the force which the rider can apply is limited to a little more than his or her weight unless a much greater and less easily sustainable effort is applied through the handlebars and the rider's body. Another fact of the traditional bicycle is that the rider presents a large frontal area to the air, causing a significant effort to be expended in overcoming wind resistance. Even in the racing "crouch" position, this effort is considerable.

It is to these basic concepts of the traditional bicycle that the present invention is directed. In the present invention, each of the above stated problems have been solved in a novel and elegant manner to provide an efficient and practical human-powered vehicle capable of achieving relatively high speeds in a far more efficient manner with less cyclist fatigue than heretofore known.

SUMMARY OF THE PRESENT INVENTION

The present invention provides a novel low-drag bicycle. In the present invention, an elongated, two piece, generally tubular frame of elliptical cross-section extends between the front and rear wheels. A cyclist assumes a recumbent position over the frame facing down. The bicycle is steered by means of the front wheel, while the cyclist powers the cycle by means of a pedal arrangement directly connected to and concentrically arranged with the rear wheel axle. The overall design is a radical dleparture from the traditional cycle and includes a repositioning of the major driving components, including the "engine", namely the rider, for maximum efficiency in the transmission of power to the driven wheel; elimination of torsional stresses in the frame; reduction in weight; simplification of the design and construction; and reduction in wind resistance. As such, my design is likely to be of more interest to the racing or sports enthusiast and, although it is unlikely to be used for shopping, certain of the ideas herein described could be applied to more conventional cycling machines. In further explanation, the pedal cranks are mounted on the same axis as the rear wheel, driving through a specially designed light weight tranmission integral with the rear wheel hub. The design aligns the principle forces both to eliminate periphral frame distortions while positioning the rider's body such that consistently high and sustainable effort can be applied to the pedals.

Further my design places the rider's body in a position akin to that of the swimmer which, in addition to lowering wind resistance, places the rider in a more comfortable position than the racing "crouch" and significantly reduces back strain.

Still further the unique "hip-hugger" rider support system, adjustable for both height and width, is positioned approximately at the riders center of gravity, further alleviating unnecessary back strain. Many components, such as wheel rims, brakes, handlebars, extension and head set are standard, thus simplifying customizing and such things as tire and brake shoe replacement.

Further, as a special accommodation to a cycle as aforedescribed I include as part of my invention a unique three piece quick release type rear axle clamp for disengaging the rear wheel assembly from the bicycle frame.

DESCRIPTION OF THE DRAWINGS

The features and advantages of the present invention will become more clear upon reading the following Description of the Preferred Embodiment in conjunction with the accompanying drawings, of which:

FIG I. is a side view of the bicycle of my invention,

FIG II. is a partial perspective view of the bicycle showing details of the steering and front fork assemblies and the cyclist support means of my invention, FIGS III. and IV. are side and rear views, respectively, of the details of the combination rear wheel axle bearing carrier and quick release device of my invention as mounted on the bicycle frame, FIG V. is a perspective view of the combination rear wheel axle bearing carrier and quick release device by itself, and FIGS VI. and VII. are a partial cross sectional side view and an end view, respectively, showing the details of a handlebar mounted speed changer in accordance with my present invention.

DESCRIPTION OF THE PREFERRED EMBODIMENT

Referring to FIG. I there is shown a drawing of the preferred embodiment of the present invention which illustrates the mechanical arrangement of the bicycle. The structural components include a frame 2 located between a front wheel assembly 4 and a rear wheel assembly 6. The bicycle is steered by the front wheel 8 which is conventionally mounted by means of front forks 10 which are attached to a steering post 12. The steering post 12 including axial front extension member 14 is pivotally mounted in ball bearings in the conventional manner within a sleeve portion 16. The sleeve portion 16 constitutes an integral part of the front frame member 18, however it could be a separate sleeve attached to the front member. The bicycle is steered by handlebars 20 adjustably attached to the axial front extension 14 of the steering post. Handlebars 20 are the conventionally shaped racing type. Attached thereto are the gear shift and brake controls 22, 24, respectively. The brake control system is standard and forms no part of this invention. It includes the usual brake actuating means 24 mounted directly to the handlebar on each side, one for the front wheel assembly and one for the rear. Extending therefrom are brake cables 26 which are connected with the usual front and rear brakes 28. The gear shift or speed changer 22 is a unique design and forms part of this invention. Its details are explained later. The front wheel is typically 20 to 27 inches in diameter, and the angle of the front forks is approximately 75° degrees in the described embodiment. This angle has been found to provide a suitable compromise between low speed handling and high speed stability, although other angles may be used. Thus far, I have described conventional components of a cycling mechanism. Hereafter, the description is unique to my invention.

As shown in FIGS. I and II, the frame 2 is basically of two piece design, constituting a front frame member 18 and a rear frame member 30. The front frame member 18 includes a sleeve portion 16, as described earlier, and is tubular and elliptical in cross section and designed to receive a similarly elliptical and telescopic portion of rear frame member 30. Front frame member 18 includes a series of axially, generally evenly spaced, holes 32, at least one of which will align with similar holes in the telescoping forward portion of the rear frame member. These two frame members are then locked to one another by means of a pin 34 or other suitable arrangement. This same pin 34 forms a part of the cyclist support means as described later. The rear frame member includes a rear wheel fork assembly 36 having two transversely spaced forks 38, as best seen in FIG. II. Each fork includes a rear wheel axle bearing upper seat 40. The rear wheel assembly includes a basically conventional bicycle wheel having the usual tire, spokes and rim (not numbered). However the hub 42 is not standard. Hub 42, which includes the rear wheel axle (not shown), is also the drive crank. As such it includes pedal crank members 44 which are directly attached to the axle. The hub includes a transmission (not shown). This tranmission can be a simple fixed ratio drive without free-wheel, such as is specified for track racing. In my preferred embodiment the transmission would be of a type having a continously variable speed over a set speed range. The speed range would of course be set by the sizing or structural relationship of the drive and driven components. In such a transmission, the pedal crank 44 as connected to the rear wheel axle would constitute the input to the transmission. The transmission output would be part of the hub itself as connected to the wheel and spoke assembly. The speed, within the selected speed range, is continously varied at will by the cyclist by means of speed changer 22 as previously described in general and speed changing cables 46 extending to the transmission assembly.

The rider support for my cycle includes a V shaped frame 50 having two legs 52 diverging radially outwardly from one another beginning at a transversely arranged rest 54. At the upper portion of the V shaped frame member there is mounted on each leg a hip pad 56. These pads whose transverse and angular position can be adjusted for individual comfort are securely fastened to the V shaped frame. At the other end of the V shape frame and extending downwardly from the rest 54 are spaced parallel frame portions 58. These portions provide the means for adjusting the position of the seat so as to accomodate any desired height and are clamped to the bicycle frame by means of a bifercated clamp 60, one on each side of the frame, and each held together by means of the same pin 34 which fixes the front and rear frame members 18, 30 to one another. While I have shown the frame to frame clamp and the rider support clamp to be one and the same member, this is by no means required. Obviously the frame member could be a single tubular member, or it could have a means separate from the seat clamp for securing two frame members together. Each of the hip pads are preferably made of foam rubber mounted on a steel backing and covered with a suitable fabric, with the steel backing being bent to curvlinear shape designed to fit the body shape of most riders.

Referring to FIGS. III, IV and V, there is illustrated a unique means for clamping the rear wheel assembly to the rear forks. Basically this includes a three piece quick release type rear axle clamp 70 comprising a generally cross sectionally U-shaped axle bearing carrier 72, a locking strap 74 formed in the shape of a loop thus to encompass the bicycle rear fork 38, and a locking lever 76. This clamp is designed such that the entire clamp is inseparable from the frame. To this end, the axle bearing carrier 72 is hingedly pinned to a fork 38 forwardly of the axle bearing upper seat 40 by means of a suitable pin 78. At an axis x rearward of the upper axle bearing seat, lock strap 74 is hingedly pinned to the axle bearing carrier. At the upper and rearward most portion of the fork 38 the locking lever 76 is hingedly pinned on axis y. It will be noted that the locking lever at its rear portion is formed such that there are two rear legs 80 which enshroud an upper portion of the bicycle rear fork 38. The upper portion of locking lever rear legs includes a lock strap groove 82 extending on an axis transverse to that of the bicycle rear fork and positioned axially forward of the axis y. One each of these quick release type rear axle clamps is provided for each bicycle rear fork. To disassemble the rear wheel assembly, the operator lifts up on the forward end 84 of the locking lever a sufficient number of arc degrees to cause the lock strap 74 to pass from a position forward of the axis y to a position significantly rearward of the axis y. This causes a release of tension on the wire loop lock strap until the strap is disengaged from within the lock strap groove 82 of the locking lever. This then will cause the axle bearing carrier 72 to swing downwardly about its hinge pin 78, thus releasing the rear axle of the rear wheel assembly and allowing the rider to withdraw the assembly from the frame. Installing the rear wheel assembly back onto the frame is a mere reverse procedure.

Referring now to FIGS. VI and VII, there is shown a unique speed changing mechanism designed to be clamped to the front handlebars as earlier mentioned. This speed changer 22 has three basic components, namely two split tubular clamp body portions 90 and a rotatable barrel 92 concentrically arranged around the tubular clamp body portions. The purpose of the clamp body portion is simply to allow means for clamping the speed changer to the handlebars and to permit its assembly over the curved portion of typical racing handlebars. To this end the ends 94 of the split body portion members are drawn together around the handlebar by means of a nut and bolt type fastener 96 or other suitable means. Concentrically arranged around this clamp body portion is the rotatable barrel 92 which is in close fitting but sliding engagement therewith. It includes a grooved outer hand grip portion 98 and a shrouded channel portion 100. The channel portion is defined by two radially extending side walls 102 spaced from one another sufficient to allow a cable 104 to be coiled there within cable 104 as shown in FIG. VI is shown as cables 46 in FIGS. I and II. To prevent rain and dirt from getting into this groove or channel 100 I have provided the clamp body portions 90 with a shroud which includes a radially outwardly extending wall 106 and an axially extending wall 108 which extends towards the hand grip portion sufficiently to completely overlap the channel 100. By rotating the barrel with one's hand, the speed changer cables 46 are pulled fore or aft thus changing the position of the speed adjusting mechanism which resides within the rear wheel hub 42.

Having thus described my invention, it will be apparent that the rider, located in a recumbent position upon the cycle, will be comfortably arranged in a prone, swimmers position, thus offering significantly less wind resistance. Further all force from the rider's legs to the pedal crank and driving mechanism of the rear wheel assembly is in a straight line with his spinal system, thereby significantly reducing back strain and increasing the efficiency of the drive due to the elimination of the usual chain and sprocket drive arrangement. The bicycle is almost infinitely adjustable and can accomodate both male and female riders from approximately fifty four inches to seventy eight inches in height and virtually any weight up to approximately 300 pounds. The frame facilitates construction from a wide range of materials from alloy steels, through aluminum and titanium to carbon-fibre or other composites depending on the potential rider's equation of performance to pocket book. The ultimate form of construction today, combining very light weight and high strength is carbon-fibre reinforced composite—a material considered to be entirely suitable for the frame of my present invention, but which cannot be thought of as a practical material from which to construct a traditional bicycle frame. The frame of my racing cycle, if carefully constructed from carbon-fibre reinforced composite, is estimated to weigh less than half the traditional racing bicycle frame, and could be built at a significantly lower cost than a traditional frame made from similar materials.

It has been described a new, streamlined bicycle including a novel frame and unique frame components to provide the above described numerous advantages over previous bicycle designs. It should be appreciated that modifications to the preferred embodiment described herein may be made by those of ordinary skill in the art and implementing the teachings of the present invention. Accordingly, the description herein for the preferred embodiment should not be construed as a limitation upon the present invention. Rather the invention should be interpreted in accordance with the appended claims.

I claim:

1. A streamlined, two-wheeled bicyle, comprising:
   a steerable front wheel assembly including a front wheel;
   a rear wheel assembly including a rear wheel and axle;
   an elongated frame having a front end to which is connected the front wheel assembly and having a rear end to which is connected the rear wheel assembly;
   said frame consisting of a front frame member having said front end and a rear frame member having said rear end, each said frame member being in the general shape of an elongated tube, one such frame member having an end portion telescopically received within the other frame member and frame locking means for fixedly adjusting the frame members together thereby allowing one to adjust at will the overall length of the bicycle;
   support means mounted to said frame for supporting a rider in a head-forward, recumbent position over the frame, said support means comprising a body support fixed to and extending upwardly of said frame, said body support including a generally V-shaped semi-resilient body support frame and a hinge means at the lower end thereof for hingedly securing the body support to the bicycle frame, said body support lying transversely of the bicycle frame, body support pads connected to the body support at the upper end portions thereof, said body support also including a rest between said hinge means and body support pads, said rest extending transversely of and resting upon the bicycle frame thereby holding the upper end of the body support off the bicycle frame when the cyclist is supported thereon in a recumbent position;
   a pedal assembly located at the rear portion of the frame so that the pedals are engaged by the feet of the rider when in said recumbent position;
   means for transmitting power from said pedal assembly to said rear wheel assembly to propel the bicycle;
   said power transmitting means being solely within and constituting a portion of said rear wheel assembly.

2. The bicycle of claim 1 wherein said hinge means is an integral portion of said frame locking means.

3. In combination with a bicycle, a body support for supporting a cyclist on the bicycle,
   said body support including a body support frame, at least one body support pad fixed to one end of said body support frame, and hinge means at the other end of said body support frame,
   said body support frame including a solid or tubular spring steel rod formed generally in a triangular shape and being open at one apex, the two free end portions of said rod being spaced from one another and extending generally parallel of one another, means extending across said one apex to close said body support frame into one continuous member, said means constituting a rest for supporting the upper end of said body support off the bicycle frame,
   said two free end portions of said rod being telescopically received within said hinge means whereby the inclination of the body support and consequently the height of the body support pads relative to the bicycle frame may be adjustably controlled by the cyclist.

4. In combination with a bicycle having a frame member for supporting a wheel and wherein said frame member includes an upper axle bearing seat, a combination wheel bearing axle carrier and quick release device,
   said quick release device comprising an axle bearing carrier, a locking lever and a locking strap,
   said axle bearing carrier including means at one end thereof for hingedly connecting the carrier to the lower portion of the frame member axially inboard of the axle bearing seat, means at the other end of said carrier for hingedly connecting thereto one end of the locking strap,
   said locking lever being hingedly connected at one end to the upper portion of the frame member along an axis transverse thereto axially outboard of the axle bearing seat and extending axially inboard thereof to a free end, said one end of the locking lever including a channel means within which the locking strap may be retained when the quick release device is in a locked position, said locking strap being in the form of a generally closed loop at at least one end thereof and being resilient such that its length may be extended slightly when put into tension, and said locking strap lying axially inward of the said axis about which the locking lever is hinged, whereby when the cyclist pulls the locking lever to release the wheel, the locking strap will be extended and caused to pivot to a position axially outboard of said axis and out of engagement with the locking lever thereby allowing the axle bearing carrier to swing to an open position and allow the wheel to be removed from the frame member.

5. A separable, two piece quick release device for locking a wheel to the frame of a bicycle comprising, an axially extending wheel axle bearing carrier and a locking lever, the axle bearing carrier including a generally U-shaped channel member and locking strap hingedly secured at one end thereof, said axle bearing carrier including hinge means at the other end thereof for hingedly securing said carrier to a bicycle frame and axially extending side walls, said side walls including means for supporting a wheel axle bearing, said locking strap comprising a loop shaped spring steel clip, said locking lever including at one end thereof means for hingedly connecting said lever to a bicycle frame and a detent means for holding the uppermost end of said locking strap in fixed position relative to frame when in a locked position.

* * * * *